United States Patent
Van der Sluis

(10) Patent No.: US 9,556,953 B2
(45) Date of Patent: Jan. 31, 2017

(54) HYDRAULICALLY ACTUATED CONTINUOUSLY VARIABLE TRANSMISSION

(71) Applicant: ROBERT BOSCH GMBH, Stuttgart (DE)

(72) Inventor: Francis Maria Antonius Van der Sluis, Sint-Michielsgestel (NL)

(73) Assignee: ROBERT BOSCH GMBH, Stuttgart (DE)

( * ) Notice: Subject to any disclaimer, the term of this patent is extended or adjusted under 35 U.S.C. 154(b) by 30 days.

(21) Appl. No.: 14/655,896

(22) PCT Filed: Dec. 24, 2013

(86) PCT No.: PCT/EP2013/077980
§ 371 (c)(1),
(2) Date: Jun. 26, 2015

(87) PCT Pub. No.: WO2014/102273
PCT Pub. Date: Jul. 3, 2014

(65) Prior Publication Data
US 2015/0345632 A1    Dec. 3, 2015

(30) Foreign Application Priority Data
Dec. 27, 2012  (NL) ...................................... 1039977

(51) Int. Cl.
*F16H 59/00*    (2006.01)
*F16H 61/00*    (2006.01)
(Continued)

(52) U.S. Cl.
CPC .... *F16H 61/0206* (2013.01); *F16H 61/66272* (2013.01); *F16H 63/065* (2013.01); *F16H 2061/66277* (2013.01)

(58) Field of Classification Search
CPC .. F16H 61/66272; F16H 55/56; F16H 63/065; F16H 61/66259; F16H 61/662
(Continued)

(56) References Cited

U.S. PATENT DOCUMENTS 4,551,119 A * 11/1985 Sugaya ............. F16H 61/66259
474/18
4,669,336 A * 6/1987 Okada ................... B60W 30/18
474/28
(Continued)

FOREIGN PATENT DOCUMENTS

DE    19921750 A1    11/1999
EP    0841504 A2    5/1998
(Continued)

OTHER PUBLICATIONS

International Search Report, dated Apr. 9, 2014, from corresponding PCT application.

*Primary Examiner* — Henry Liu
(74) *Attorney, Agent, or Firm* — Young & Thompson

(57) ABSTRACT

A hydraulically actuated continuously variable transmission (1) with two pulleys (5, 6), a drive belt (4) in frictional contact with these pulleys (5, 6) and a control device that includes at least two pressure chambers (8, 9) that are both associated with one pulley (6) and that are arranged such that a clamping force (Fs) that is exerted on the drive belt (4) by that one pulley (6) during operation of the transmission 1 is determined by the difference between the two pressures (Pline, Pcomp) that are respectively exerted therein and that are respectively actively controlled by a respective pressure control valve (13; 40) of the control device.

8 Claims, 3 Drawing Sheets

Figure 1:
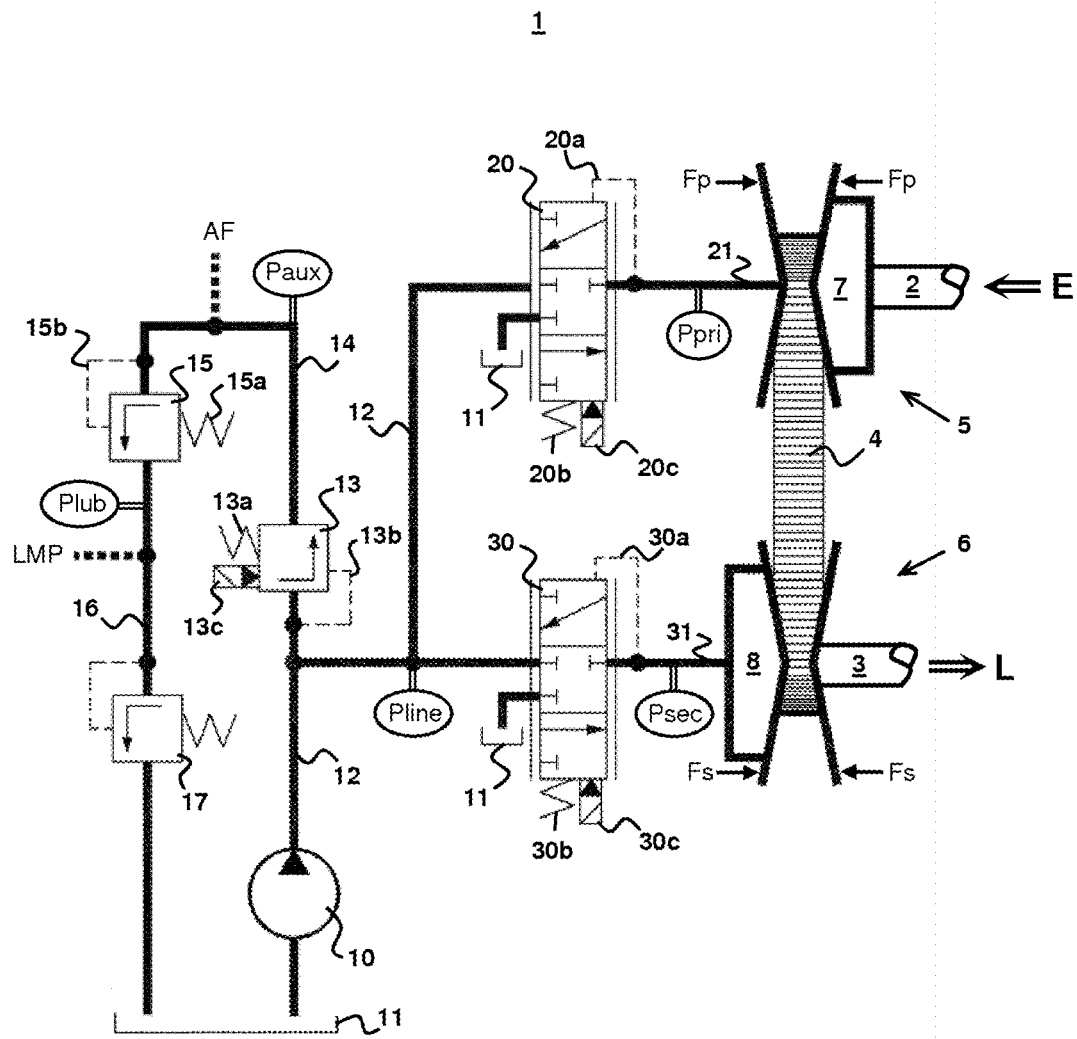

(51) Int. Cl.
*F16H 63/00* (2006.01)
*F16H 61/02* (2006.01)
*F16H 63/06* (2006.01)
*F16H 61/662* (2006.01)

(58) Field of Classification Search
USPC .......................................................... 474/28
See application file for complete search history.

(56) References Cited

U.S. PATENT DOCUMENTS

| | | | | |
|---|---|---|---|---|
| 4,672,864 A * | 6/1987 | Morimoto | ............ | B60W 10/02 |
| | | | | 474/28 |
| 4,846,765 A * | 7/1989 | Sakai | ................. | F16H 61/0021 |
| | | | | 474/28 |
| 5,184,981 A * | 2/1993 | Wittke | .............. | F16H 61/66272 |
| | | | | 474/18 |
| 5,217,412 A * | 6/1993 | Indlekofer | ............ | B60W 30/18 |
| | | | | 474/28 |
| 5,334,108 A * | 8/1994 | Lamers | .................. | F16H 9/125 |
| | | | | 474/28 |
| 5,776,022 A * | 7/1998 | Schellekens | ......... | F16H 63/065 |
| | | | | 474/18 |
| 5,776,028 A * | 7/1998 | Matsuda | ........... | F16H 61/66272 |
| | | | | 474/28 |
| 6,012,998 A * | 1/2000 | Schutz | ................... | F16H 55/56 |
| | | | | 474/199 |
| 6,015,359 A * | 1/2000 | Kunii | ................... | F16H 57/0489 |
| | | | | 474/18 |
| 6,336,878 B1 * | 1/2002 | Ehrlich | ................... | F16H 55/56 |
| | | | | 474/18 |
| 6,336,880 B1 * | 1/2002 | Agner | ............... | F16H 61/66272 |
| | | | | 474/18 |
| 6,561,934 B2 * | 5/2003 | Kashiwase | ........ | F16H 61/66272 |
| | | | | 474/18 |
| 6,565,464 B1 * | 5/2003 | Panther | ................ | F15B 13/0402 |
| | | | | 285/123.15 |
| 6,679,805 B2 * | 1/2004 | Rienks | .............. | F16H 61/66259 |
| | | | | 474/28 |
| 6,712,724 B2 * | 3/2004 | Katou | ................. | F16H 61/0031 |
| | | | | 474/18 |
| 7,025,706 B2 * | 4/2006 | Katou | ............ | B60W 30/18054 |
| | | | | 475/127 |
| 7,677,997 B2 * | 3/2010 | Hiramatsu | .............. | F16H 55/56 |
| | | | | 137/112 |
| 7,686,715 B2 * | 3/2010 | Carlson | ................. | F16H 63/065 |
| | | | | 474/18 |
| 2002/0160867 A1 * | 10/2002 | Katou | ................. | F16H 61/0031 |
| | | | | 474/28 |
| 2004/0059489 A1 * | 3/2004 | Hanggi | ............. | F16H 61/66263 |
| | | | | 701/51 |
| 2004/0214669 A1 * | 10/2004 | Katou | ............... | F16H 61/66272 |
| | | | | 474/28 |
| 2005/0014584 A1 * | 1/2005 | Katou | ............... | F16H 61/66272 |
| | | | | 474/28 |
| 2006/0009321 A1 * | 1/2006 | Carlson | ................. | F16H 63/065 |
| | | | | 474/18 |
| 2007/0142142 A1 * | 6/2007 | Yamaguchi | ....... | F16H 61/66272 |
| | | | | 474/28 |

FOREIGN PATENT DOCUMENTS

| | | |
|---|---|---|
| EP | 1331422 A1 | 7/2003 |
| EP | 1553333 A2 | 7/2005 |
| WO | WO2006016797 A1 | 2/2006 |

* cited by examiner

HYDRAULICALLY ACTUATED CONTINUOUSLY VARIABLE TRANSMISSION

The present disclosure relates to a hydraulically actuated continuously variable transmission, as defined in the preamble of the claim 1 hereinafter, more in particular to an electro-hydraulic control device thereof.

Such a transmission and control device are generally known, for example from the European patent publication EP-A-0841504. The known continuously variable transmission includes a primary or driving pulley and a secondary or driven pulley, as well as a drive belt, which may be one of several known types, wrapped around and in frictional contact with the said pulleys. The transmission provides a transmission speed ratio between the primary and secondary pulleys that may be controlled to an arbitrary value within a range of speed ratios covered by the transmission through an appropriate actuation thereof by means of an electro-hydraulic control device of the transmission. In the typical motor vehicle application of the transmission, the driving pulley is connected to—and rotationally driven by—an engine and the driven pulley is connected to—and rotationally drives—a load, i.e. the driven wheels of the vehicle.

The known control device includes two pressure chambers, each associated with a respective pulley for effecting a respective clamping force on the drive belt. Further, the control device includes means for realising an accurately controlled pressure level in the cylinder of a piston-and-cylinder-assembly associated with the primary pulley, which pressure level is denoted the primary pressure and which cylinder is denoted the primary cylinder hereinafter, and for realising an accurately controlled pressure level in the cylinder of a piston-and-cylinder-assembly associated with the secondary pulley, which latter pressure level is denoted the secondary pressure and which latter cylinder is denoted the secondary cylinder hereinafter. Several hydraulic layouts of the control device are known for this purpose, an example whereof comprises the following parts:

- a hydraulic pump for supplying a flow of hydraulic fluid to a main hydraulic line,
- a line pressure valve capable of controlling the fluid pressure in the main hydraulic line, which pressure is denoted the line pressure hereinafter,
- a primary pressure valve, interposed between the main hydraulic line and a first hydraulic branch connected to the primary cylinder, capable of controlling the primary pressure between a first minimum pressure level and the line pressure,
- a secondary pressure valve, interposed between the main hydraulic line and a second hydraulic branch connected to the secondary cylinder, capable of controlling the secondary pressure between a second minimum pressure level and the line pressure,
- and valve control means for determining respective desired values for all of the line pressure, the primary pressure and the secondary pressure and for adjusting the said valves to control a respective, actually prevailing pressure to coincide with the respective desired value.

The above-described, known control device functions satisfactorily per se and provides a relatively energy efficient actuation of the transmission. However, in practice, a noticeable minimum of a couple of bar always applies to the said first and second minimum pressure levels. As a consequence, also the clamping force that is exerted by the respective pulley on the drive belt is limited to respective minimum primary and secondary clamping force levels, even though operating conditions occur wherein a lower primary or secondary clamping force would suffice for the proper clamping of the drive belt, in terms of preventing the slipping thereof relative to the pulleys (e.g. when only a very small or no driving power at all is to be transmitted by the transmission). This possible lower clamping force is to be preferred in principle, because it would not only lower the loading, i.e. tensioning, of the drive belt, but it would also improve the operating efficiency of the transmission. Moreover, the speed ratio of the transmission can in principle be changed most rapidly if one of the primary and the secondary pressure is reduced to zero (and the respective other one of the primary and the secondary pressure is maximised).

A further complicating factor that inevitably occurs in the known transmission design is that during operation of the transmission the pressure cylinders rotate together with the respective pulley, such that respective centrifugal pressures are build-up therein, which respective centrifugal pressures result in respective (minimum) clamping forces. In case of the secondary pulley this centrifugal pressure is typically partly compensated by adding a further pressure chamber, denoted the compensation cylinder, to the piston-and-cylinder-assembly that is associated with the secondary pulley. The compensation cylinder is arranged such that a force is generated in dependence on the hydraulic pressure therein that is directed opposite to the clamping force generated by the secondary pressure. By keeping the compensation cylinder filled with hydraulic fluid, a centrifugal pressure builds-up in this latter cylinder as well, which latter centrifugal pressure counteracts the former centrifugal pressure in the secondary cylinder. However, this counteracting or compensating of the centrifugal pressure in the secondary cylinder is typically not completely, i.e. not 100% effective.

It is an object of the present disclosure to improve the functionality and efficiency of the known control device, while maintaining its favourable features in relation to the actuation of the continuously variable transmission. More in particular, it is aimed to minimise or at least reduce the said first and second minimum pressure levels for the primary and the secondary pressure respectively, at least relative to the known transmission.

According to the present disclosure the aforementioned aim is achieved with the novel transmission according to the claim 1 hereinafter. Generally speaking, by providing the control device with means for controlling the pressure level in the compensation cylinder in accordance with the present disclosure, the clamping force that respectively results from such compensation pressure and the respective, primary or secondary pressure can be favourably controlled to a force level below the value that would be dictated by the respective first or second minimum pressure level alone. More specifically, the said respective clamping force can, in principle, be reduced down to zero.

Several embodiments of the means for controlling the pressure level in the compensation cylinder appear to be conceivable. In a first and perhaps most direct implementation of the above, novel control principle, the known control device is additionally provided with:

- a compensation pressure valve, interposed between the main hydraulic line and a third hydraulic branch connected to the compensation cylinder, capable of controlling the compensation pressure between a third minimum pressure level and the line pressure.

As a result, if the compensation pressure is controlled to be equal to the respective primary or secondary pressure, the respectively generated clamping force becomes zero (provided that these pressures act on respective surfaces having the same active surface area). In fact, also if the centrifugal pressure compensation is not 100% effective, the respectively generated clamping force can be controlled to zero by applying a compensation pressure that is higher than the respective primary or secondary pressure (by an appropriate amount). Of course, if the compensation pressure is controlled zero, the respectively generated clamping force is determined by the respective primary or secondary pressure alone, just like it is in the known transmission.

Figure 2:
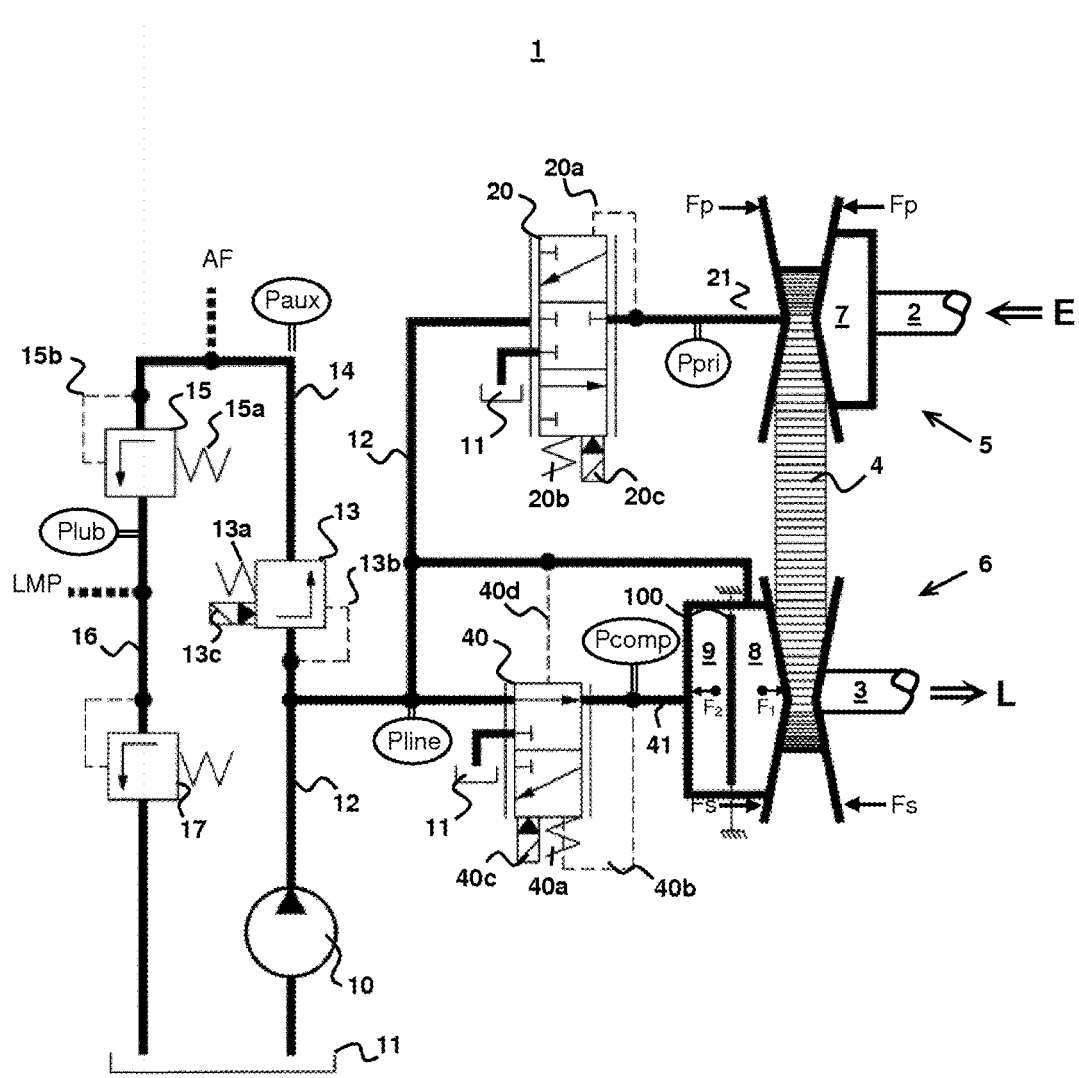
Figure 3:
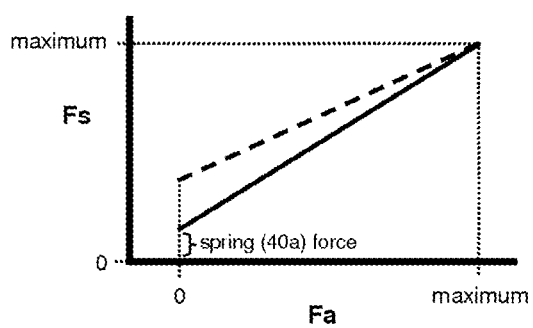
Figure 4:
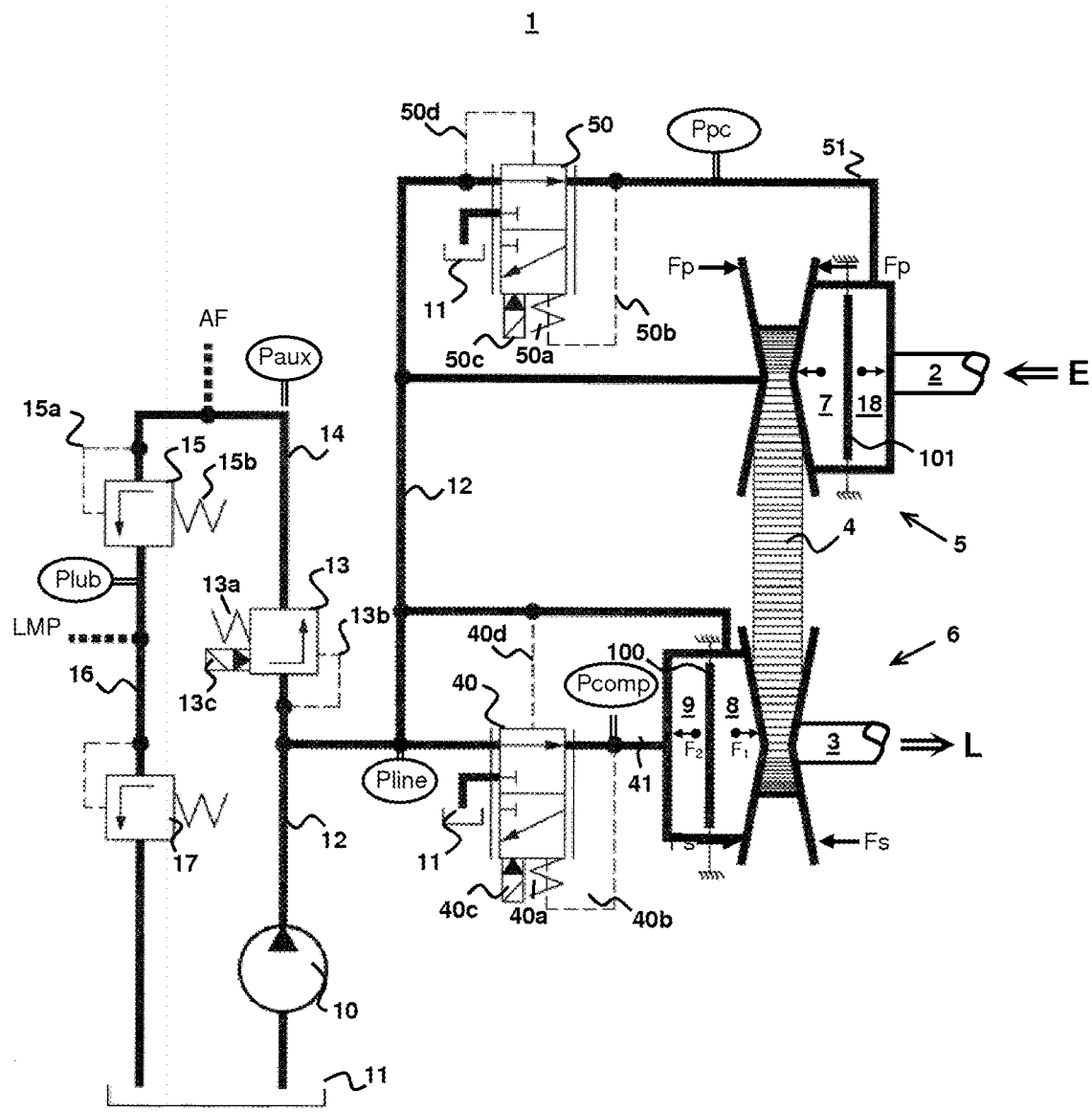

This first embodiment provides an easy and fully effective implementation of the transmission and of the control device according to the present disclosure. It does, however, require the addition of a fourth pressure control valve and the extension of the valve control means to control such fourth valve as well. In a second embodiment of the means for controlling the pressure level in the compensation cylinder according to the present disclosure, these additional requirements are favourably avoided, which second embodiment is described and explained hereinafter in detail with reference to the enclosed drawing figures, whereof:

FIG. 1 is a schematic representation of a prior art and to be improved continuously variable transmission, FIG. 2 represents the novel transmission of the present disclosure in a favourable and to be preferred embodiment thereof, FIG. 3 is a graph illustrating an aspect of the operation of the novel transmission, and FIG. 4 represents another embodiment the novel transmission of the present disclosure.

In the figures, identical references relate to corresponding technical functions or structures, as the case may be. The thick lines indicate hydraulic lines, i.e. passages for hydraulic fluid, whereas the dashed lines indicate pressure control lines for the control, i.e. for the biasing of the various hydraulic valves.

FIG. 1 schematically shows the known continuously variable transmission 1, for realising and changing a transmission speed ratio between an input or primary shaft 2 and an output or secondary shaft 3 of the transmission 1, which transmission 1 further includes an electro-hydraulic control device for the actuation of the transmission 1 and for the operation of auxiliary hydraulic functions AF thereof, as well as for the lubrication of moving parts LMP of the transmission 1. The transmission 1 is intended to be incorporated between an engine E and a load L for varying the transmission speed ratio there between within a continuous range of possible speed ratios. The known transmission 1 further comprises a drive belt 4, that is wrapped around and rotationally connects a primary pulley 5 placed on the primary shaft 2 and secondary pulley 6 placed on the secondary shaft 3. The drive belt 4 is frictionally engaged with pulley discs of the respective pulleys 5, 6 by means of respective clamping forces Fp, Fs exerted there between. The primary clamping force Fp is generated by a primary pressure Ppri exerted in a pressure chamber 7 of a piston-and-cylinder assembly that is associated with the primary pulley 5, i.e. the primary cylinder 7. The secondary clamping force Fs is generated by a secondary pressure Psec exerted in a pressure chamber 8 of a piston-and-cylinder assembly that is associated with the secondary pulley 6, i.e. the secondary cylinder 8.

The electro-hydraulic control device of the transmission is arranged to realize the primary pressure Ppri and the secondary pressure Psec in a controlled manner. To this end, the control device comprises a hydraulic pump 10 for generating a flow fluid from a reservoir of hydraulic fluid at low pressure to a main hydraulic line 12 at high(-er) pressure. The pressure of the hydraulic fluid in this main line 12, i.e. the pump or line pressure Pline, is controlled by means of a pressure control valve, i.e. a line pressure valve 13. This line pressure valve 13 is provided with valve biasing means including a spring 13a, a valve actuator 13c and a pressure-feedback line 13b that together control the line pressure Pline. In particular, the spring 13a ensures that a minimum pressure level is controlled, even in the absence of any controlled actuation of the line pressure valve 13 via the valve actuator 13c. In these circumstances, a force that is exerted by the spring 13a (acting on a valve body) is balanced by a force that is exerted by the line pressure Pline (acting on the valve body) via the pressure-feedback line 13b. Naturally, the line pressure valve 13 is arranged such that it is closed if the spring force is higher than the line pressure force and that it opens if the line pressure force exceeds the spring force. When it opens, the line pressure valve 13 allows fluid to pass from the main line 12 into an auxiliary line 14 of the control device.

The line pressure Pline can be controlled to a level above the said minimum pressure level determined by the spring 13a, by means of the valve actuator 13c that can exert a variable force (acting on a valve body as well). This actuator force is than additionally to be balanced by the line pressure Pline (acting on the valve body) via the pressure-feedback line 13b. Typically, the valve actuator 13c allows the line pressure valve 13 to control the line pressure Pline between 5 and 75 bar.

The pressure of the hydraulic fluid in the auxiliary line 14, i.e. the auxiliary pressure Paux, is controlled by means of a further pressure control valve, i.e. an auxiliary pressure valve 15. In FIG. 1, the auxiliary pressure valve 15 is provided with valve biasing means that consists (only) of a spring 15a and a pressure-feedback line 15b, which means that—in this example—the auxiliary pressure Paux is controlled to a predetermined pressure level. The pressurized hydraulic fluid in the auxiliary line 14 is typically applied to operate one or more auxiliary hydraulic functions AF of the transmission 1 such as the opening or closing of a clutch that may be provided in the drive line to (dis-)connect the load L from the engine E.

When it opens, the auxiliary pressure valve 15 allows fluid to pass from the auxiliary line 14 into a lubrication line 16 wherefrom moving parts of the transmission 1 such as the drive belt 4 and shaft bearings are supplied with hydraulic fluid. In the control device of FIG. 1, yet a further pressure control valve, i.e. a lubrication pressure valve 17 is included to control a lubrication pressure Plub. However, alternative arrangements of the control device are known that do not rely on such lubrication pressure valve 17.

For realising the main actuation function of the control device, namely the control of the primary pressure Ppri and the secondary pressure Psec, two further valves 20, 30 are included therein. A primary pressure valve 20 is interposed between the main line 12 and a primary hydraulic branch 21 that hydraulically connects to the primary cylinder 7 and a secondary pressure valve 30 is interposed between the main line 12 and a secondary hydraulic branch 31 that hydraulically connects to the secondary cylinder 8. Both the primary pressure valve 20 and the secondary pressure valve 30 are provided with valve biasing means of their own, respectively including a spring 20a; 30a, a valve actuator 20c; 30c and a pressure-feedback line 20b; 30b, which respective valve biasing means function similar to the valve biasing means of the line pressure valve 13 discussed hereinabove. Of course, as is clearly shown in FIG. 1, the primary valve 20 and the secondary valve 30 do not open a hydraulic connection to the auxiliary line 14 for reducing the respective cylinder pressure Ppri, Psec, but rather directly connect the respective hydraulic branch 21; 31 and cylinder 7; 8 to the reservoir 11. This latter design allows the primary pressure Ppri and the secondary pressure Psec to be reduced rapidly and to a lower, minimum pressure level, which minimum pressure level is determined solely by the force exerted by the spring 20a; 30a of the respective valve biasing means.

The known transmission 1 and control device according to FIG. 1 come with the disadvantage that a minimum pressure level for both the primary pressure Ppri and the secondary pressure Psec applies, which minimum pressure level is considerably larger than 1 bar and typically amounts to several, for example around 4 bar. Moreover a centrifugal pressure is build-up in the primary cylinder 7 and the secondary cylinder 8 during operation of the transmission. As a result, both the primary clamping force Fp and the secondary clamping force Fs cannot be lowered freely, but, instead, are bound by a certain minimum force level, even though transmission operating conditions occur wherein an even lower primary or secondary clamping force Fp, Fs would suffice for the actuation of the transmission.

Thus, in order to improve the actuation of the known transmission 1, in particular in terms of the efficiency thereof, the electro-hydraulic control device should preferably be arranged such that it is capable of controlling one or both of the primary or secondary clamping force Fp, Fs to a low(-er) level, preferably to an arbitrarily low force level. To this end a novel embodiment of in particular the control device of the transmission 1 is provided, as schematically illustrated in FIG. 2.

The transmission 1 of FIG. 2 to a large extent correspond with that of FIG. 1, but, as a first difference, the piston-and-cylinder-assembly of the secondary pulley 6 in FIG. 2 includes two pressure chambers, namely the secondary cylinder 8 and a compensation cylinder 9. The compensation cylinder 9 is arranged on the opposite side of a piston 100 of the piston-and-cylinder-assembly of the secondary pulley 6 relative to the secondary cylinder 8, which piston 100 is fixed to the secondary shaft 3. By this arrangement of the piston-and-cylinder-assembly of the secondary pulley 6, a pressure exerted in the compensation cylinder 9, i.e. the compensation pressure Pcomp, generates a further force $F_2$ that is directed oppositely to the force $F_1$ generated by the secondary pressure Psec in the secondary cylinder 8. In other words, the further force $F_2$ generated by the compensation pressure Pcomp counteracts the force $F_1$ generated by the secondary pressure Psec, such that the secondary clamping force Fs that is ultimately exerted on the drive belt 4 amounts to only this latter force F1 minus the said further force $F_2$, i.e. Fs=$F_1$-$F_2$ (Note again: assuming, for the sake of simplicity, that the secondary pressure Psec and the compensation pressure Pcomp act on the same surface area).

This principle arrangement of the piston-and-cylinder-assembly of the secondary pulley 6 is known per se (see for example EP-A-1331422). In practice such principle arrangement is applied to compensate for the centrifugal pressure that is build-up in the (fluid in the) secondary cylinder 8 due to the rotation thereof during operation. In this known application, the compensation cylinder 9 is not actively pressurised by the control device, but is filled with hydraulic fluid such that a corresponding centrifugal pressure builds-up, due to the said rotation during operation, in this compensation cylinder 9 as well. In the said known application thereof, the compensation cylinder 9 is normally supplied with hydraulic fluid either from the lubrication line 16 or from the secondary cylinder 8.

According to the present disclosure, however, the control device is provided with means for actively pressurising the compensation cylinder 9, i.e. for actively controlling the compensation pressure Pcomp. These means may be simply composed of an additional pressure control valve that is to be interposed between the main line 12 and the compensation cylinder 9, however, in FIG. 2 a preferred embodiment of the novel control device means is illustrated, which preferred embodiment does not require an additional pressure control valve, at least not in comparison with the known control device of FIG. 1.

In the FIG. 2 the control device is arranged to (hydraulically) connect the secondary cylinder 8 directly to the main line 12, such that the line pressure Pline also serves as the secondary pressure Psec that is applied to the secondary cylinder 8, which secondary pressure Psec is thus controlled by the line pressure valve 13. Moreover, for realising the compensation pressure Pcomp that is applied to the compensation cylinder 9 of the secondary pulley 6, a differential pressure valve 40 is interposed between the main line 12 and a further hydraulic branch 41 that hydraulically connects to the compensation cylinder 9. This differential pressure valve 40 is provided with valve biasing means that including a spring 40a, a valve actuator 40c, a compensation pressure-feedback line 40b and a secondary pressure-feedback line 40d that carries the line pressure Pline, at least in the preferred embodiment of FIG. 2. The valve actuator 40c may be of any known type, such as the known hydraulically acting type and the known mechanically acting type.

The pressure-feedback lines 40b and 40d of the differential pressure valve 40 are arranged such that the compensation pressure Pcomp and the line pressure Pline act in opposite direction on this valve (body), whereby the compensation pressure Pcomp is controlled to be lower than the line pressure Pline by an amount that is determined by the combined force exerted on the valve (body) by the spring 40a and the actuator 40c of the respective valve biasing means. In other words, the differential pressure valve 40 controls a (positive) difference between the line pressure Pline and the compensation pressure Pcomp, which difference increases as the actuator force increases. Thus, in the shown arrangement of the differential pressure valve 40, i.e. of the valve biasing means 40a-d thereof, the secondary clamping force Fs, resulting from the positively acting (i.e. the secondary clamping force Fs increasing) line pressure Pline and the negatively acting (i.e. the secondary clamping force Fs decreasing) compensation pressure Pcomp, increases as the force exerted by the actuator 40c increases.

Preferably, the valve biasing means of the differential pressure valve 40 are designed such that together the actuator 40c is able to counteract a maximum (line) pressure (Pline) carried in the secondary pressure-feedback line 40d. Moreover, the spring 40a preferably exerts only a minimal force (on the valve body), for the reason that this spring force determines the smallest difference that can be controlled by the differential pressure valve 40 between the line pressure Pline and the compensation pressure Pcomp, which spring force thus also determines the smallest secondary clamping force Fs that can be realized and applied to the drive belt 4 by the secondary pulley 6 during operation of the transmission 1.

In FIG. 3 the dependency between the secondary clamping force Fs and the actuator force Fa the actuator 40c of the differential pressure valve 40 is plotted in an illustrative graph by the solid line. For comparison, the dashed line in the graph of FIG. 3 indicates the same dependency, however, for the actuator force Fa the actuator 30c of the secondary pressure valve 30 of the known control device of FIG. 1.

It is noted that the actuator 40c may in principle also be arranged on the opposite side of the (body of the) differential pressure valve 40 relative to the spring 40a, in which case the compensation pressure Pcomp can in principle be controlled to fully coincide with the line pressure Pline, such that the secondary clamping force Fs can, in principle, be controlled completely down to zero. Alternatively, but also to this latter effect, the compensation cylinder 9 can be provided with an active surface area that is somewhat larger than that of the secondary cylinder 8.

Another embodiment of the transmission 1 according to the present disclosure is schematically illustrated in FIG. 4. In this latter embodiment, not only the piston-and-cylinder-assembly of the secondary pulley 6 includes both a pressure cylinder 8 and a compensation chamber 9, but also the piston-and-cylinder-assembly of the primary pulley 5, namely the primary cylinder 7 and a primary compensation cylinder 18. Like the above-described compensation cylinder 9 of the secondary pulley 6, the primary compensation cylinder 18 is arranged on the opposite side of a primary piston 101 of the piston-and-cylinder-assembly of the primary pulley 5 relative to the primary cylinder 7, which primary piston 101 is fixed to the primary shaft 2. By this arrangement of the piston-and-cylinder-assembly of the primary pulley 5, a pressure exerted in the primary compensation cylinder 18, i.e. the primary compensation pressure Ppc, generates a compensating force $F_4$ that is directed oppositely to the force $F_3$ generated by the primary pressure Ppri in the secondary cylinder 8. In other words, the compensating force $F_4$ generated by the primary compensation pressure Ppc counteracts the force $F_3$ generated by the primary pressure Ppri, such that the primary clamping force Fp that is ultimately exerted on the drive belt 4 amounts to only this latter force $F_3$ minus the said compensating force $F_4$, i.e. $Fp=F_3-F_4$.

In the FIG. 4 the control device is arranged to (hydraulically) connect both the primary cylinder 7 and the secondary cylinder 8 directly to the main line 12, such that the line pressure Pline serves both as the primary pressure Ppri and as the secondary pressure Psec that are thus both controlled by the line pressure valve 13. Moreover, for realising the primary compensation pressure Ppc that is applied to the primary compensation cylinder 18 of the primary pulley 5, a further differential pressure valve 50 is interposed between the main line 12 and yet a further hydraulic branch 51 that hydraulically connects to the compensation cylinder 9. This further differential pressure valve 50 is also provided with valve biasing means that including a spring 50a, a valve actuator 50c, a primary compensation pressure-feedback line 50b and a line pressure-feedback line 50d. The pressure-feedback lines 50b and 50d of the further differential pressure valve 50 are arranged such that the primary compensation pressure Ppc and the line pressure Pline act in opposite direction on this valve (body), whereby the primary compensation pressure Ppc is controlled to be lower than the line pressure Pline by an amount that is determined by the combined force exerted on the valve (body) by the spring 50a and the actuator 50c of the respective valve biasing means.

Thus, the further differential pressure valve 50 controls a (positive) difference between the line pressure Pline and the primary compensation pressure Ppc, which difference increases as the force exerted by the respective actuator 50c increases. Thus the primary clamping force Fp, resulting from the positively acting line pressure Pline and the negatively acting primary compensation pressure Ppc, increases as the force exerted by the respective actuator 50c increases.

In summary, the present disclosure concerns a hydraulically actuated continuously variable transmission 1 with two pulleys 5 and 6, a drive belt 4 in frictional contact with these pulleys 5 and 6 and a control device that includes at least two pressure chambers 8 and 9 that are both associated with one pulley 6. The said two pressure chambers 8 and 9 are arranged such that a clamping force Fs that is exerted on the drive belt 4 by that one pulley 6 during operation of the transmission 1 is determined by the difference between the two pressures Pline and Pcomp that are respectively exerted therein and that are both actively controlled by means of respective pressure control valves 13 and 40 of the control device.

The present disclosure, in addition to the entirety of the preceding description and all details of the accompanying figures, also concerns and includes all the features of the appended set of claims. Bracketed references in the claims do not limit the scope thereof, but are merely provided as non-binding examples of the respective features. The claimed features can be applied separately in a given product or a given process, as the case may be, but it is also possible to apply any combination of two or more of such features therein. The invention(s) represented by the present disclosure is (are) not limited to the embodiments and/or the examples that are explicitly mentioned herein, but also encompasses amendments, modifications and practical applications thereof, in particular those that lie within reach of the person skilled in the relevant art.

The invention claimed is:

1. Continuously variable transmission (1) for transmitting a driving power between an engine (E) and a load (L) with a variable transmission ratio, in particular in a drive line of a vehicle, which transmission (1) is provided with a drive belt (4) mounted between the pulley discs of two pulleys poelies (5, 6) of the transmission (1), whereof a primary pulley (5) comprises a primary pressure chamber (7) wherein a primary hydraulic pressure (Ppri) is applied that determines or that contributes to determining a primary clamping force (Fp) exerted on the drive belt (4) between the pulley discs of the primary pulley (5), whereof a secondary pulley (6) comprises a secondary pressure chamber (8) wherein a secondary hydraulic pressure (Psec) is applied that generates a basic clamping force ($F_1$) that determines or that contributes to determining a secondary clamping force (Fs) exerted on the drive belt (4) between the pulley discs of the secondary pulley (6), and whereof at least the secondary pulley (6) further comprises a secondary compensation pressure chamber (9) wherein a hydraulic compensation pressure (Pcomp) can be applied that generates a compensation force ($F_2$) directed oppositely to the basic clamping force ($F_1$) and that likewise contributes to determining the secondary clamping force (Fs) by at least partly compensation, i.e. counteracting, the basic clamping force, which transmission (1) is further provided with a control device for the control of the primary pressure (Ppri), the secondary pressure (Psec) and the compensation pressure (Pcomp) and comprising a pump (10) for pumping of hydraulic fluid from a reservoir (11) for hydraulic fluid to a main line (12) of the control device, a controllable line pressure valve (13) for the control of a line pressure (Pline) in the main line (12), which main line (12) is connected to the secondary pressure chamber (8), whereby the secondary pressure (Psec) corresponds to the line pressure (Pline), wherein the control device further comprises a controllable compensation pressure valve (40) for the control of the compensation pressure (Pcomp) in the compensation pressure chamber (9) of the secondary pulley (6), which compensation pressure valve (40) is placed between the main line (12) and a further hydraulic branch (41) of the control device that is connected to the secondary compensation pressure chamber (9).

2. The continuously variable transmission (1) according to claim 1, wherein the compensation pressure valve (40) is executed as a differential pressure valve (40) with an actuator (40c) and with pressure-feedback lines (40b, 40d), respectively carrying the compensation pressure (Pcomp) in the compensation pressure chamber (9) of the secondary pulley (6) and the line pressure (Pline), which compensation pressure valve (40) is arranged to control the compensation pressure (Pcomp) in the compensation pressure chamber (9) of the secondary pulley (6) at a certain level below the line pressure (Pline) as determined by the actuator (40c) thereof.

3. The continuously variable transmission (1) according to claim 1, wherein the control device is further provided with a first controllable pressure valve (20) provided between the main line (12) and a first branch (21) thereof that is connected to the pressure chamber (7) of the respective other pulley (5) for the control of the pressure (Ppri) therein.

4. The continuously variable transmission (1) according to claim 1, wherein the primary pulley (6) comprises a primary compensation pressure chamber (18) wherein a primary compensation pressure (Pcp) can be applied that generates a force directed oppositely to and at least partly compensation, i.e. counteracting the primary clamping force (Fp); the main line (12) is also connected to the primary pressure chamber (7), whereby the primary pressure (Ppri) corresponds to the line pressure (Pline); and the control device yet further comprises a further compensation pressure valve (50) for the control of the primary compensation pressure (Pcp), which further compensation pressure valve (50) is placed between the main line (12) and a yet further hydraulic branch (51) of the control device that is connected to the primary compensation pressure chamber (18).

5. The continuously variable transmission (1) according to claim 4, wherein the further compensation pressure valve (50) is executed as a differential pressure valve (50) with an actuator (50c) and with pressure-feedback lines (50b, 50d) respectively carrying the primary compensation pressure (Pcp) and the line pressure (Pline), which further compensation pressure valve (50) is arranged to control the primary compensation pressure (Pcp) at a certain level below the line pressure (Pline) as determined by the actuator (50c) thereof.

6. The continuously variable transmission (1) according to claim 2, wherein the control device is further provided with a first controllable pressure valve (20) provided between the main line (12) and a first branch (21) thereof that is connected to the pressure chamber (7) of the respective other pulley (5) for the control of the pressure (Ppri) therein.

7. The continuously variable transmission (1) according to claim 2, wherein the primary pulley (6) comprises a primary compensation pressure chamber (18) wherein a primary compensation pressure (Pcp) can be applied that generates a force directed oppositely to and at least partly compensation, i.e. counteracting the primary clamping force (Fp); the main line (12) is also connected to the primary pressure chamber (7), whereby the primary pressure (Ppri) corresponds to the line pressure (Pline); and the control device yet further comprises a further compensation pressure valve (50) for the control of the primary compensation pressure (Pcp), which further compensation pressure valve (50) is placed between the main line (12) and a yet further hydraulic branch (51) of the control device that is connected to the primary compensation pressure chamber (18).

8. The continuously variable transmission (1) according to claim 7, wherein the further compensation pressure valve (50) is executed as a differential pressure valve (50) with an actuator (50c) and with pressure-feedback lines (50b, 50d) respectively carrying the primary compensation pressure (Pcp) and the line pressure (Pline), which further compensation pressure valve (50) is arranged to control the primary compensation pressure (Pcp) at a certain level below the line pressure (Pline) as determined by the actuator (50c) thereof.

* * * * *